United States Patent
Sun

(10) Patent No.: US 11,954,266 B2
(45) Date of Patent: Apr. 9, 2024

(54) METHOD FOR INTERACTING WITH VIRTUAL WORLD, HOST, AND COMPUTER READABLE STORAGE MEDIUM

(71) Applicant: HTC Corporation, Taoyuan (TW)

(72) Inventor: Pei Sun, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/074,522

(22) Filed: Dec. 5, 2022

(65) Prior Publication Data

US 2023/0195236 A1 Jun. 22, 2023

Related U.S. Application Data

(60) Provisional application No. 63/291,908, filed on Dec. 20, 2021.

(51) Int. Cl.
*G06F 3/01* (2006.01)
*G06F 3/0482* (2013.01)
*G06F 3/04845* (2022.01)
*G06F 3/0485* (2022.01)

(52) U.S. Cl.
CPC ............ *G06F 3/017* (2013.01); *G06F 3/0482* (2013.01); *G06F 3/04845* (2013.01); *G06F 3/0485* (2013.01)

(58) Field of Classification Search
CPC .... G06F 3/017; G06F 3/0482; G06F 3/04845; G06F 3/0485; G06F 3/04815; G06F 3/04883; G06F 3/011
See application file for complete search history.

(56) References Cited

U.S. PATENT DOCUMENTS

| 11,150,800 | B1 | 10/2021 | Longest |
|---|---|---|---|
| 2012/0113223 | A1* | 5/2012 | Hilliges ................. G06F 3/011 348/46 |
| 2016/0306431 | A1* | 10/2016 | Stafford ............... G02B 27/017 |
| 2018/0046245 | A1* | 2/2018 | Schwarz ............ G02B 27/0093 |
| 2019/0042957 | A1 | 2/2019 | Holz et al. |
| 2022/0262080 | A1* | 8/2022 | Burton .................. G06V 40/67 |
| 2022/0374085 | A1* | 11/2022 | Nguyen ............... G06F 3/0304 |

FOREIGN PATENT DOCUMENTS

| CN | 107548470 | 1/2018 |
|---|---|---|
| CN | 109313505 | 2/2019 |
| CN | 110389658 | 10/2019 |
| CN | 112198962 | 1/2021 |
| TW | 202026816 | 7/2020 |
| TW | 202046085 | 12/2020 |

OTHER PUBLICATIONS

"Office Action of Taiwan Counterpart Application", dated Aug. 21, 2023, p. 1-p. 15.

* cited by examiner

*Primary Examiner* — Premal R Patel
(74) *Attorney, Agent, or Firm* — JCIPRNET

(57) ABSTRACT

The embodiments of the disclosure provide a method for interacting with a virtual world, a host, and a computer readable storage medium. The method includes: determining a hand gesture and accordingly determining an indicator in the virtual world; in response to determining that the hand gesture is a pinch gesture, performing a specific function corresponding to a position indicated by the indicator in the virtual world or a specific object indicated by the indicator in the virtual world.

19 Claims, 16 Drawing Sheets

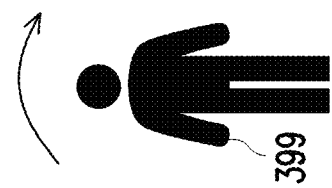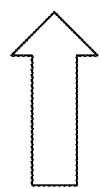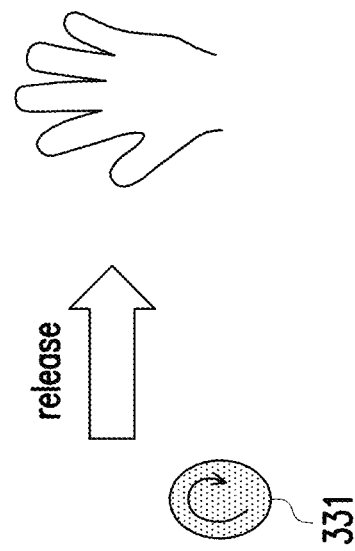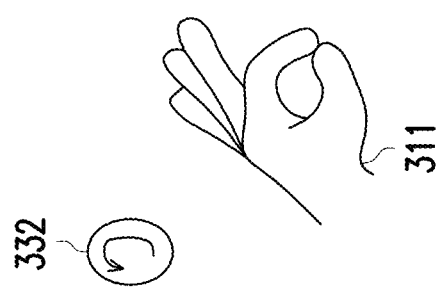
FIG. 3B

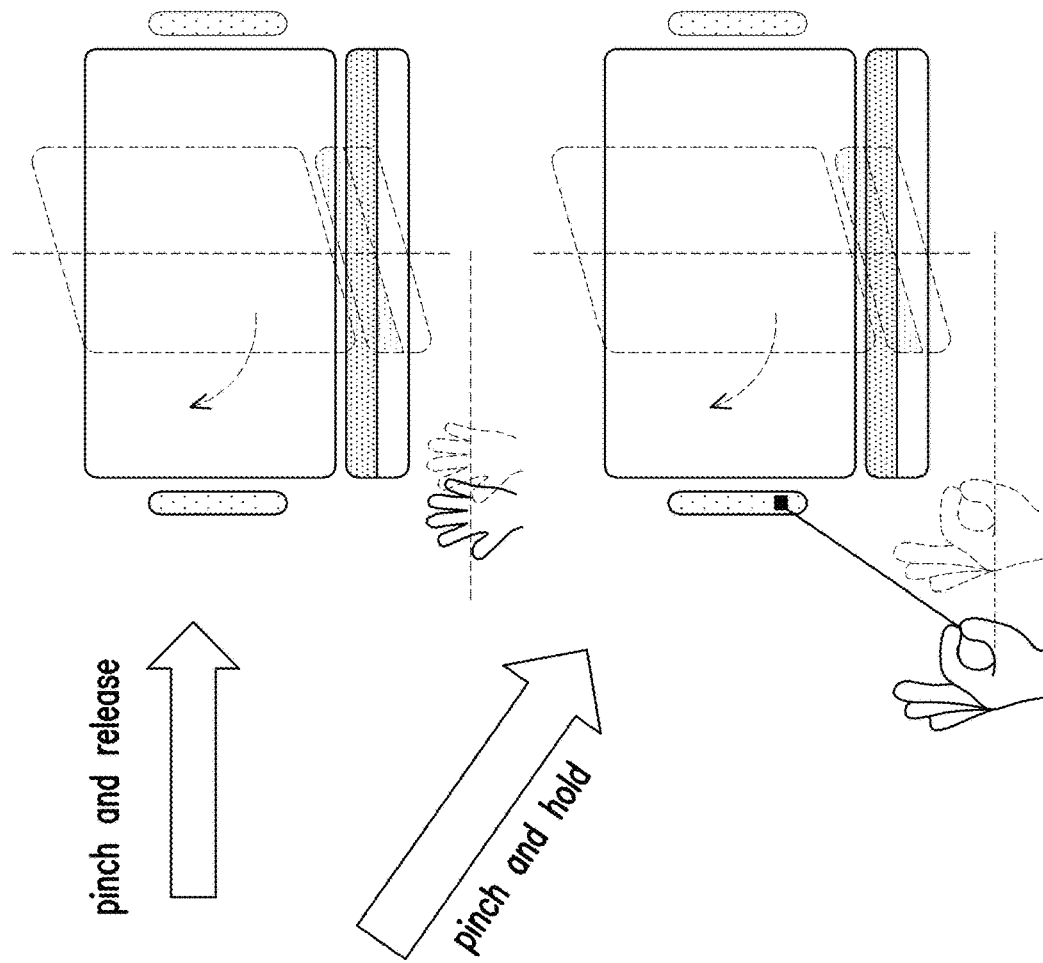
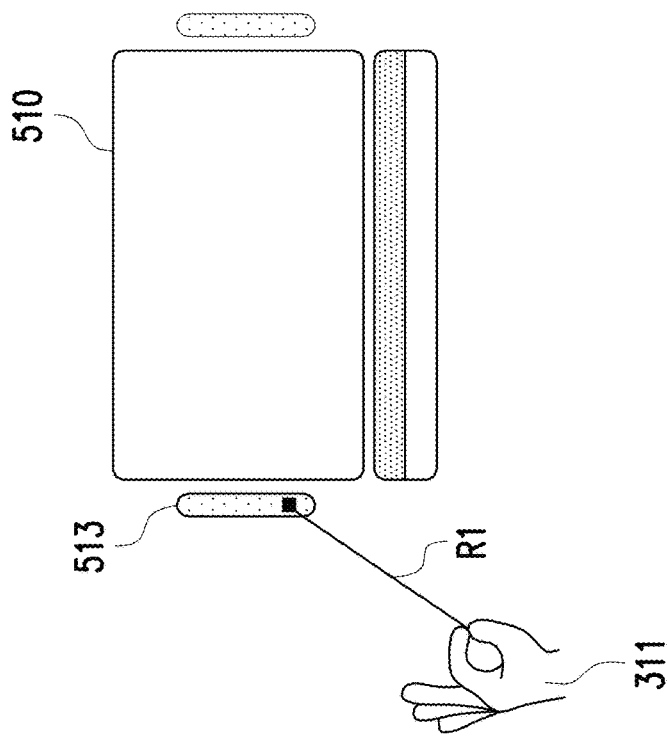
FIG. 8

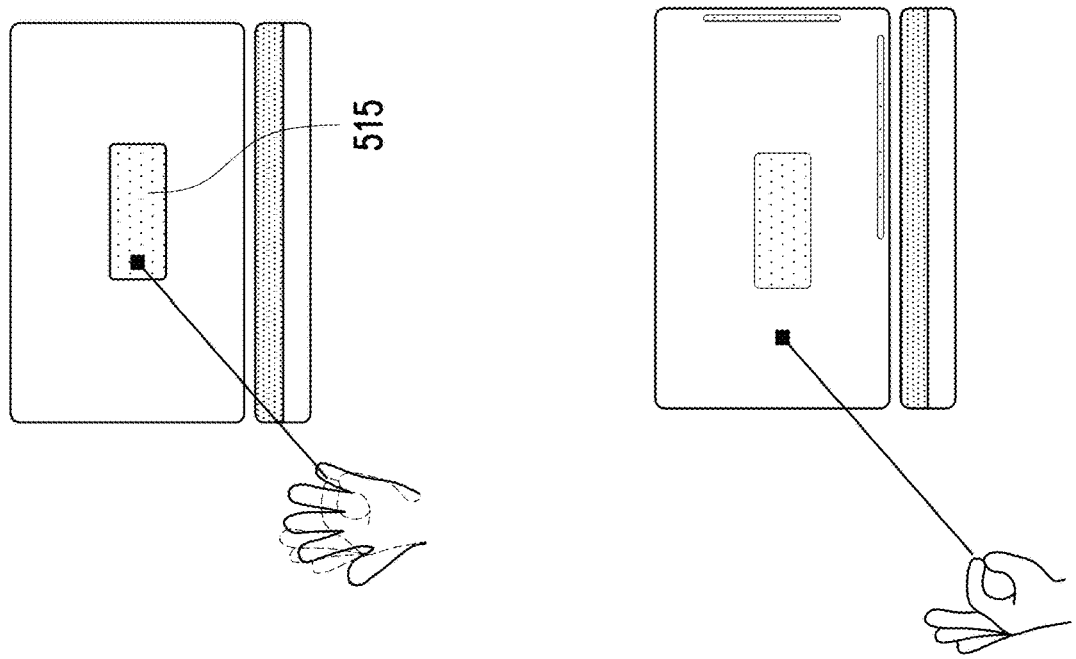
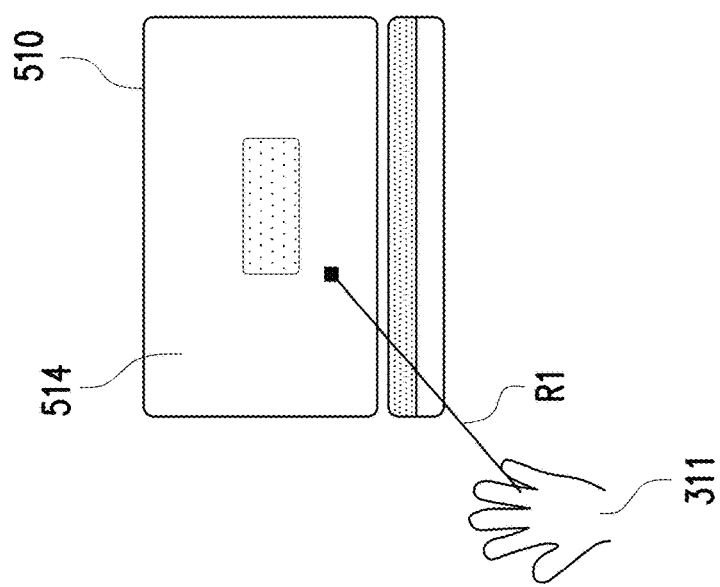
FIG. 9A

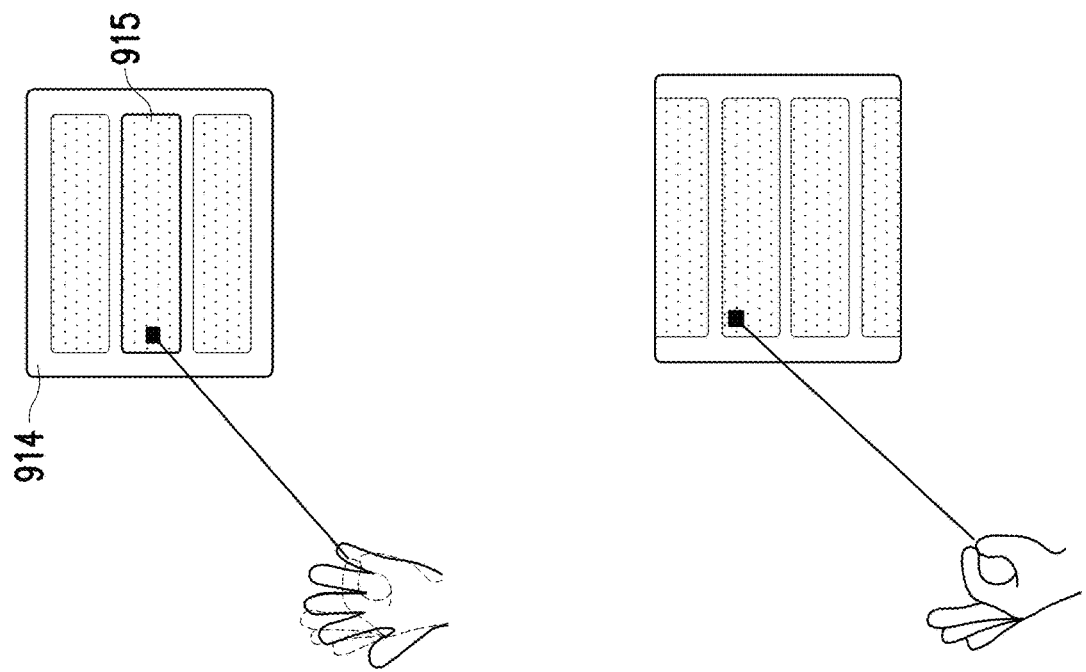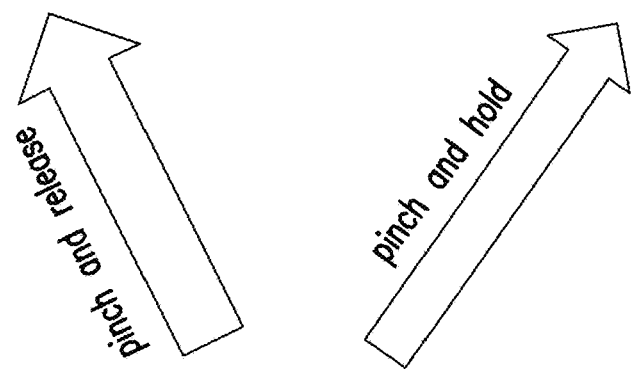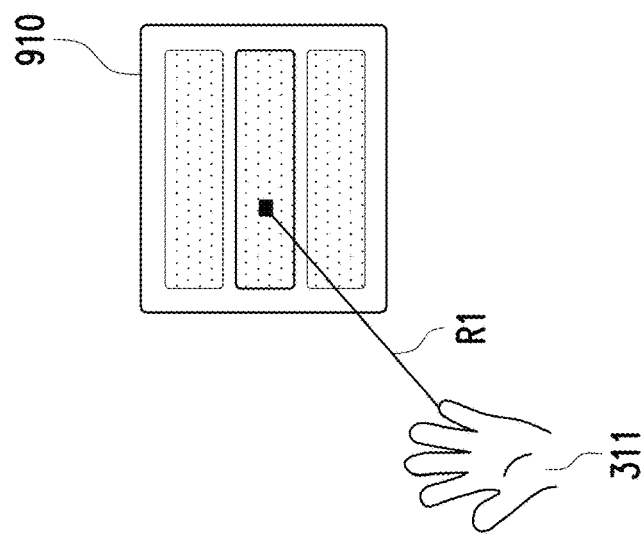
FIG. 9B

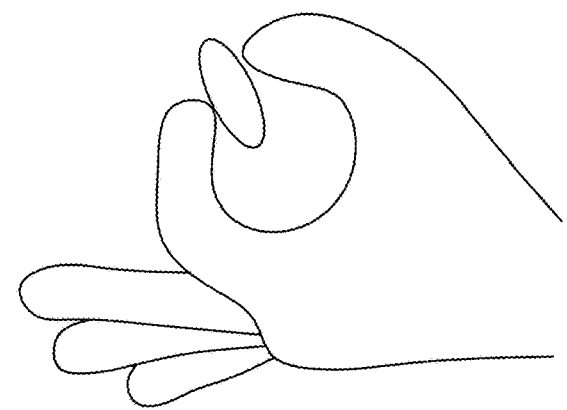
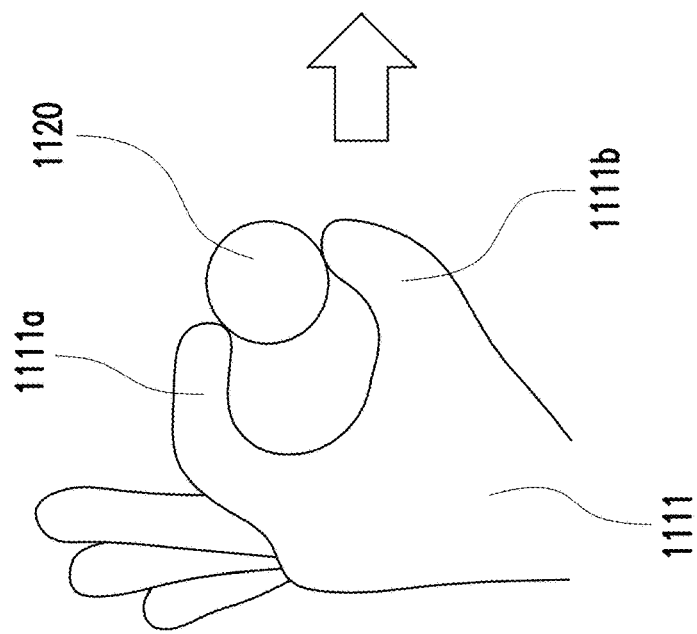
FIG. 11

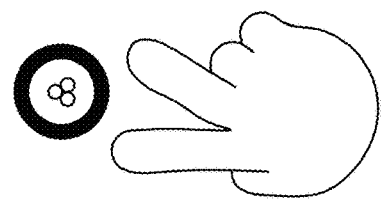
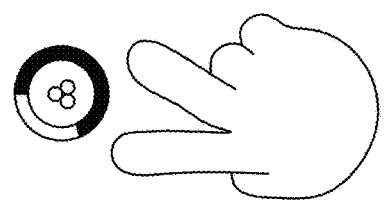
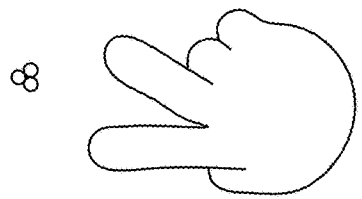
FIG. 12

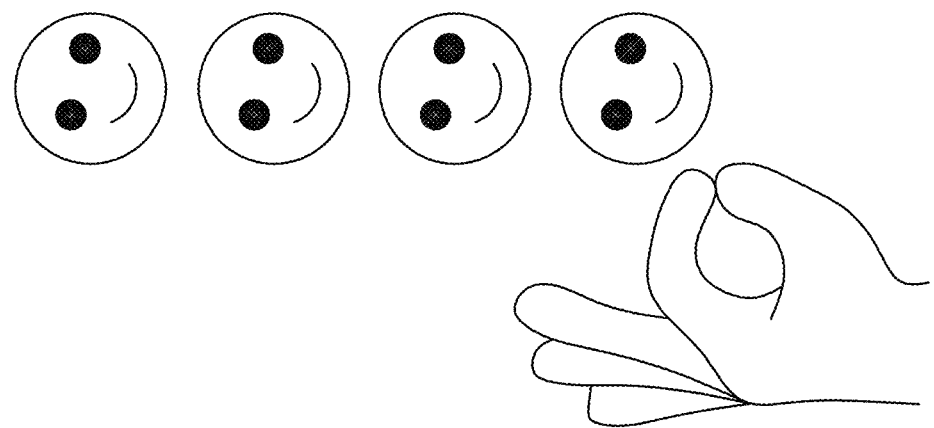
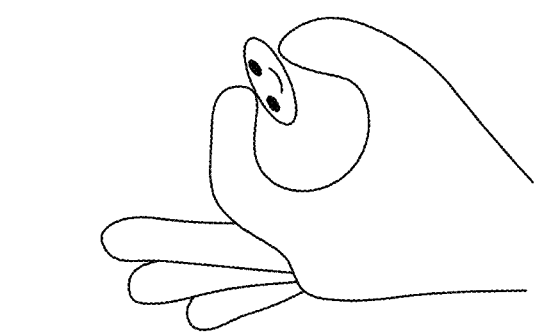
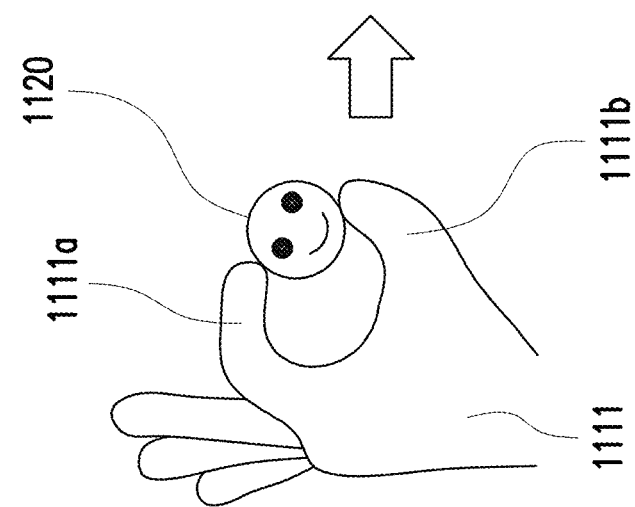
FIG. 13

METHOD FOR INTERACTING WITH VIRTUAL WORLD, HOST, AND COMPUTER READABLE STORAGE MEDIUM

CROSS-REFERENCE TO RELATED APPLICATION

This application claims the priority benefit of U.S. provisional application Ser. No. 63/291,908, filed on Dec. 20, 2021. The entirety of the above-mentioned patent application is hereby incorporated by reference herein and made a part of this specification.

BACKGROUND

1. Field of the Invention

The present disclosure generally relates to a method for interacting with a virtual world, a host, and a computer readable storage medium.

2. Description of Related Art

Nowadays, it is common for users to use reality services such as virtual reality (VR) services. When immersing in the VR world, the user may interact with the VR world with hand gestures. Therefore, it would be beneficial for the developer to design various mechanisms for the user to interact with the VR world with various hand gestures.

SUMMARY OF THE INVENTION

Accordingly, the disclosure is directed to a method for interacting with a virtual world, a host, and a computer readable storage medium, which may be used to solve the above technical problems.

The embodiments of the disclosure provide a method for interacting with a virtual world, adapted to a host, including: determining a hand gesture and accordingly determining an indicator in the virtual world; in response to determining that the hand gesture is a pinch gesture, performing a specific function corresponding to a position indicated by the indicator in the virtual world or a specific object indicated by the indicator in the virtual world.

The embodiments of the disclosure provide a host including a storage circuit and a processor. The storage circuit stores a program code. The processor is coupled to storage circuit and accesses the program code to perform: determining a hand gesture and accordingly determining an indicator in a virtual world; in response to determining that the hand gesture is a pinch gesture, performing a specific function corresponding to a position indicated by the indicator in the virtual world or a specific object indicated by the indicator in the virtual world.

The embodiments of the disclosure provide a non-transitory computer readable storage medium, the computer readable storage medium recording an executable computer program, the executable computer program being loaded by a host to perform steps of: determining a hand gesture and accordingly determining an indicator in a virtual world; in response to determining that the hand gesture is a pinch gesture, performing a specific function corresponding to a position indicated by the indicator in the virtual world or a specific object indicated by the indicator in the virtual world.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

FIG. 3A and FIG. 3B show application scenarios according to a first embodiment of the disclosure.

FIG. 8 shows an application scenario according to a fourth embodiment of the disclosure.

FIG. 9A and FIG. 9B show application scenarios according to a fifth embodiment of the disclosure.

FIG. 11 shows a schematic diagram of a pinch object according to an embodiment of the disclosure.

FIG. 12 shows a schematic diagram of a gesture for invoking a synchronization menu according to an embodiment of the disclosure.

FIG. 13 shows a schematic diagram of changing the appearance of the pinch object according to an embodiment of the disclosure.

DESCRIPTION OF THE EMBODIMENTS

Figure 1:
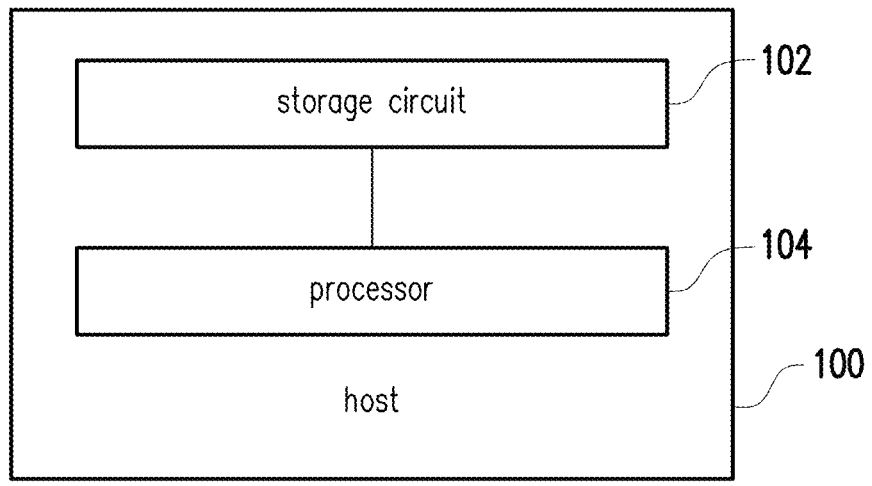
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In FIG. 1, the host 100 can be any device capable of tracking hand gestures of the user. In one embodiment, the host 100 can be a head-mounted display (HMD) that provides AR/VR services/contents. In some embodiments, the HMD can determine the gestures performed by the hands of the user via performing inside-out tracking mechanisms, but the disclosure is not limited thereto.

In some embodiments, the HMD can include a (front) camera having a field of view (FOV), and when the hands of the user are in the FOV of the camera, the HMD can track the hands and accordingly determined the gestures based on the images captured by the camera, but the disclosure is not limited thereto. In the disclosure, details of the inside-out tracking mechanism can be referred to the related prior arts, and the details thereof would not be further described.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or program codes that can be executed by the processor 104.

The processor 104 is coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 can access the modules/program codes stored in the storage circuit 102 to implement the method for interacting with a virtual world provided in the disclosure, which would be further discussed in the following.

Figure 2:
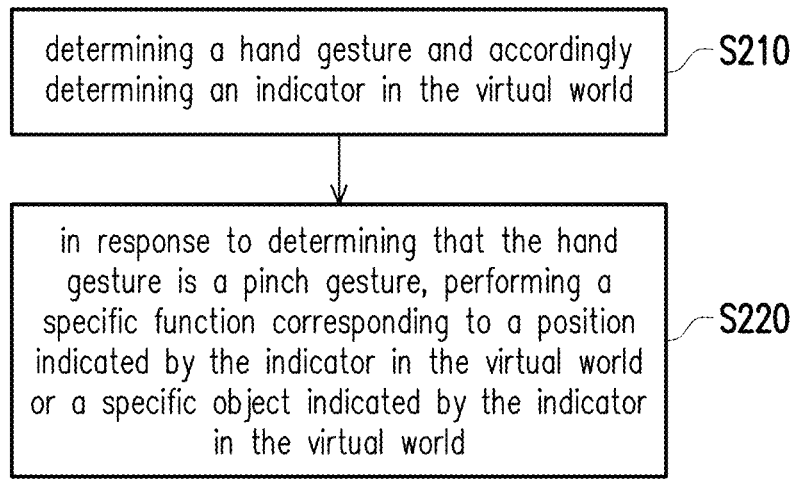
FIG. 2 shows a flow chart of the method for interacting with a virtual world according to an embodiment of the disclosure.

See FIG. 2, which shows a flow chart of the method for interacting with a virtual world according to an embodiment of the disclosure. The method of this embodiment may be executed by the host 100 in FIG. 1, and the details of each step in FIG. 2 will be described below with the components shown in FIG. 1.

In step S210, the processor 104 determines a hand gesture and accordingly determining an indicator in the virtual world. In the embodiments of the disclosure, the virtual world can be, for example, the VR world provided by the host 100 to the user, but the disclosure is not limited thereto. In other embodiments, the visual content of other reality services (e.g., augmented reality service, mixed reality service or the like) provided by the host 100 to the user can be generally understood as the virtual world, but the disclosure is not limited thereto.

In one embodiment, the processor 104 may determine the hand gesture of the user via the aforementioned inside-out tracking mechanism. For example, the processor 104 may control the (front) camera of the host 100 to capture the user's hands within the field of view of the camera as images and recognize the hand gestures of the user in the images via analysing the captured images, but the disclosure is not limited thereto.

In one embodiment, the processor 104 can show/render a hand object corresponding to the hand of the user in the virtual world, and the appearance of the hand object can be adjusted to correspond to the hand gesture determined in step S210.

In one embodiment, the indicator determined by the processor 104 in the virtual world may be a raycast emitted from the hand object.

In one embodiment, in the procedure of determining the raycast associated with the hand gesture of the user's hand, the processor 104 may determine a reference point and a reference direction on the hand. In one embodiment, the reference point may correspond to a wrist joint of the user's hand, and the reference direction may be a normal direction of a palm of the user's hand. In other embodiments, the processor 104 may regard any other point related to the user's hand as the reference point. In one embodiment, the processor 104 may firstly determine the plane corresponding to the palm of the user's hand and accordingly define the normal direction of this plane as the reference direction, but the disclosure is not limited thereto.

After determining the reference point and the reference direction, the processor 104 may determine the raycast based on the reference point and the reference direction on the user's hand, wherein the raycast passes the reference point and is perpendicular to the reference direction, but the disclosure is not limited thereto. In other embodiments, the processor 104 may determine the raycast associated with the user's hand based on any existing raycast determining mechanism.

In other embodiments, the indicator considered can be implemented in other forms, such as an arrow sign, a cross sign or other indicative symbols. For better explaining the concept of the disclosure, the indicator would be assumed to be the raycast emitted from the hand object in the virtual world, but the disclosure is not limited thereto.

In step S220, in response to determining that the hand gesture is a pinch gesture, the processor 104 performs a specific function corresponding to a position indicated by the indicator in the virtual world or a specific object indicated by the indicator in the virtual world.

In the embodiments of the disclosure, the specific function performed by the processor 104 can be different in various embodiments, which would be introduced in the following.

Figure 3A:
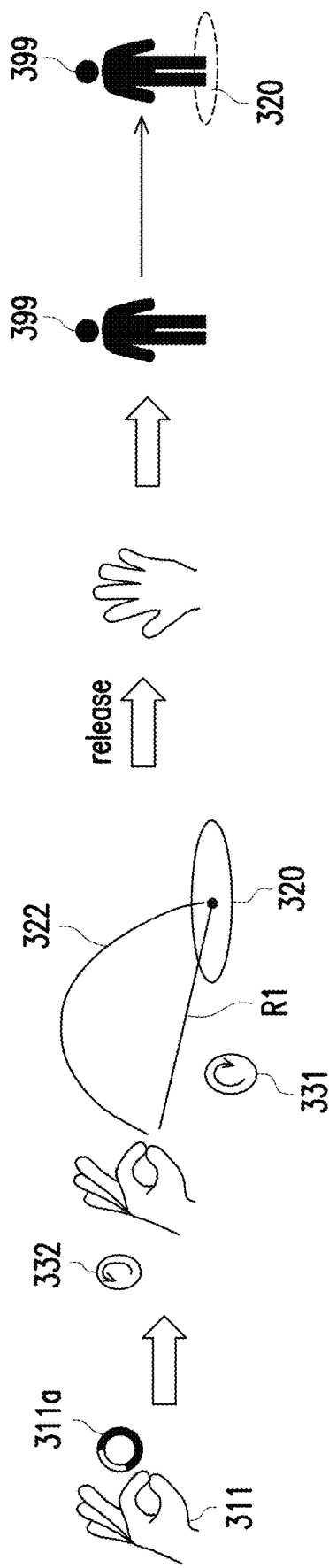

See FIG. 3A and FIG. 3B, wherein FIG. 3A and FIG. 3B show application scenarios according to a first embodiment of the disclosure. Roughly speaking, the mechanism of the first embodiment can be used to teleport the user representative object of the user in the virtual world to another position or turn the view angle of the user representative object. Detailed discussion would be provided in the following.

In FIG. 3A, the processor 104 may render a hand object 311 corresponding to the hand gesture determined in step S210. In the embodiment, the hand gesture of the user's hand is assumed to be performing the pinch gesture (e.g., the index finger touching the thumb), and hence the hand object 311 is shown to be performing the pinch gesture.

In one embodiment, once the hand gesture is determined to be performing the pinch gesture, the processor 104 may determine whether the pinch gesture has been maintained for more than a time threshold (e.g., 1 second). In one embodiment, the processor 104 may show a progress circle 311a near the hand object 311 for showing the accumulated time of how long the pinch gesture has been maintained. In this case, when the progress circle 311a reaches 100%, it can be understood as that the pinch gesture has been maintained for the time threshold, but the disclosure is not limited thereto.

In FIG. 3A, in response to determining that the pinch gesture has been maintained for the time threshold, the processor 104 can show a reference area 320 at the position indicated by the indicator R1 (e.g., a raycast) in the virtual world, show a visual guide 322 corresponding to the reference area 320 during the hand gesture maintaining the pinch gesture, and show turn areas 331 and 332 in the virtual world.

In the embodiment, the user may determine where to release the pinch gesture in the virtual world. In FIG. 3A, it is assumed that the user releases the pinch gesture without triggering the turn areas 331 and 332.

In the embodiments of the disclosure, the processor 104 can determine two triggering areas in the real world for the user to trigger the turn areas 331 and 332. In this case, the user may move the user's hand to the corresponding triggering area for triggering the turn areas 331 or 332, and the details would be discussed with FIG. 4A and FIG. 4B.

In one embodiment, in response to determining that the user releases the pinch gesture without triggering the turn areas 331 and 332, the processor 104 may move the user representative object 399 to the reference area 320 in the virtual world. That is, when the user releases the pinch gesture without triggering the turn areas 331 and 332, the user representative object 399 can be teleported to the place indicated by the indicator R1. Accordingly, the embodiments of the disclosure provide a novel way for the user to move the user representative object 399 in the virtual world.

In detail, the user may move the user representative object 399 in the virtual world by several ways, conventionally. One of which is to physically move the user's body in the real world, and another is to control the movement of the user representative object 399 via, for example, a joystick. However, based on the solution provided by the embodiments of the disclosure, the user can simply perform the pinch gesture and release the pinch gesture without triggering the turn areas 331 and 332, and the user representative object 399 can be accordingly moved to the place indicated by the indicator R1, which provides a more efficient way for the user to move the user representative object 399.

In the first embodiment, each of the turn areas 331 and 332 corresponds to a specific angle. In FIG. 3A, the turn area 331 may correspond to a specific angle of 45 degrees, and the turn area 332 may correspond to a specific angle of −45 degrees. In other embodiments, the specific angles corresponding to the turn areas 331 and 332 can be determined to be any value based on the requirements of the designer.

FIG. 3B, it is assumed that the user releases the pinch gesture while triggering the turn area 331. In this case, the processor 104 turns a view angle of the user representative object 399 in the virtual world by the specific angle (e.g., 45 degrees) corresponding to the turn area 331. In another embodiment, if the user releases the pinch gesture while triggering the turn area 332, the processor 104 may turn the view angle of the user representative object 399 in the virtual world by the specific angle (e.g., −45 degrees) corresponding to the turn area 332.

Accordingly, the embodiments of the disclosure provide a novel way for the user to turn the view angle of the user representative object 399 in the virtual world.

In detail, the user may turn the view angle the user representative object 399 in the virtual world by several ways, conventionally. One of which is to physically turn the user's head while the user wearing the host 100 (e.g., the HMD), and another is to control the view angle of the user representative object 399 via, for example, a joystick. However, based on the solution provided by the embodiments of the disclosure, the user can simply perform the pinch gesture and release the pinch gesture while triggering the turn areas 331 or 332, and the view angle of the user representative object 399 can be accordingly turned by the corresponding specific angle, which provides a more efficient way for the user to turn the view angle of the user representative object 399.

Figure 4B:
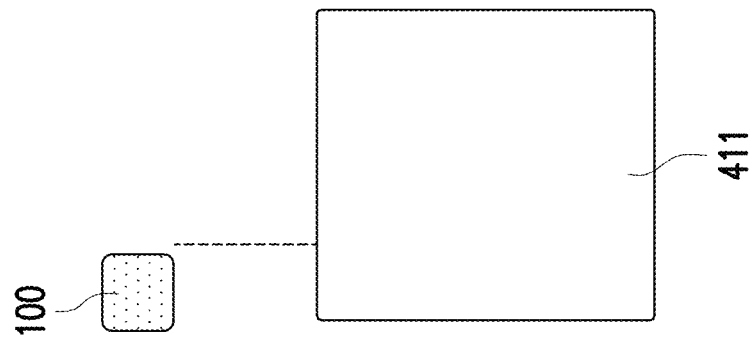
FIG. 4B shows a side view of FIG. 4A.
Figure 4A:
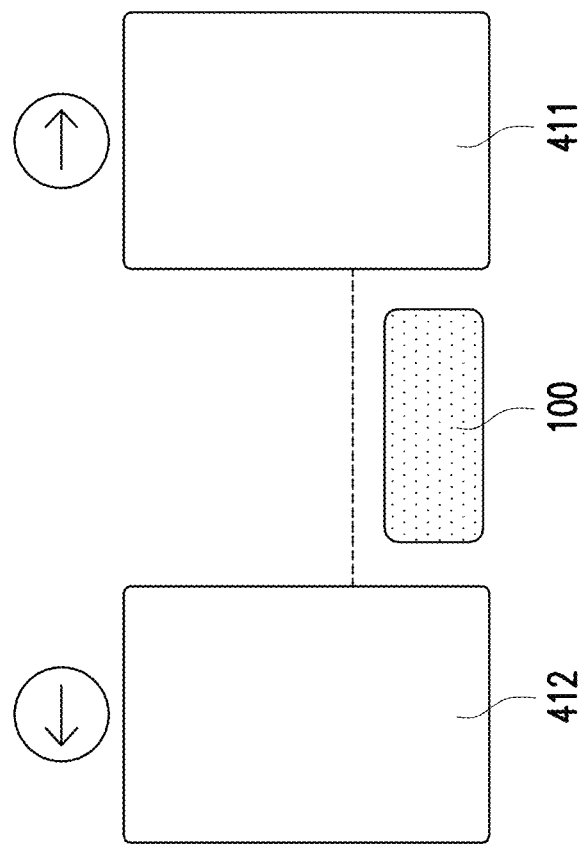
FIG. 4A shows a right view of the host and the triggering areas according to the first embodiment.

See FIG. 4A and FIG. 4B, wherein FIG. 4A shows a right view of the host and the triggering areas according to the first embodiment, and FIG. 4B shows a side view of FIG. 4A. In FIG. 4A and FIG. 4B, the triggering areas 411 and 412 may respectively correspond to the turn areas 331 and 332 in FIG. 3A and FIG. 3B, wherein the triggering areas 411 and 412 can be implemented by using the concept of colliders, but the disclosure is not limited thereto. In some embodiments, the triggering areas 411 and 412 can be visible or invisible to the user.

In the embodiment, when the user moves the user's hand to the triggering area 411 while maintaining the pinch gesture and release the pinch gesture inside of the triggering area 411, the processor 104 may determine that the user releases the pinch gesture while triggering the turn area 331. In this case, the processor 104 may accordingly turn the view angle of the user representative 399 by the specific angle (e.g., 45 degrees) corresponding to the turn area 331.

In another embodiment, when the user moves the user's hand to the triggering area 412 while maintaining the pinch gesture and release the pinch gesture inside of the triggering area 412, the processor 104 may determine that the user releases the pinch gesture while triggering the turn area 332. In this case, the processor 104 may accordingly turn the view angle of the user representative 399 by the specific angle (e.g., −45 degrees) corresponding to the turn area 332.

Figure 5:
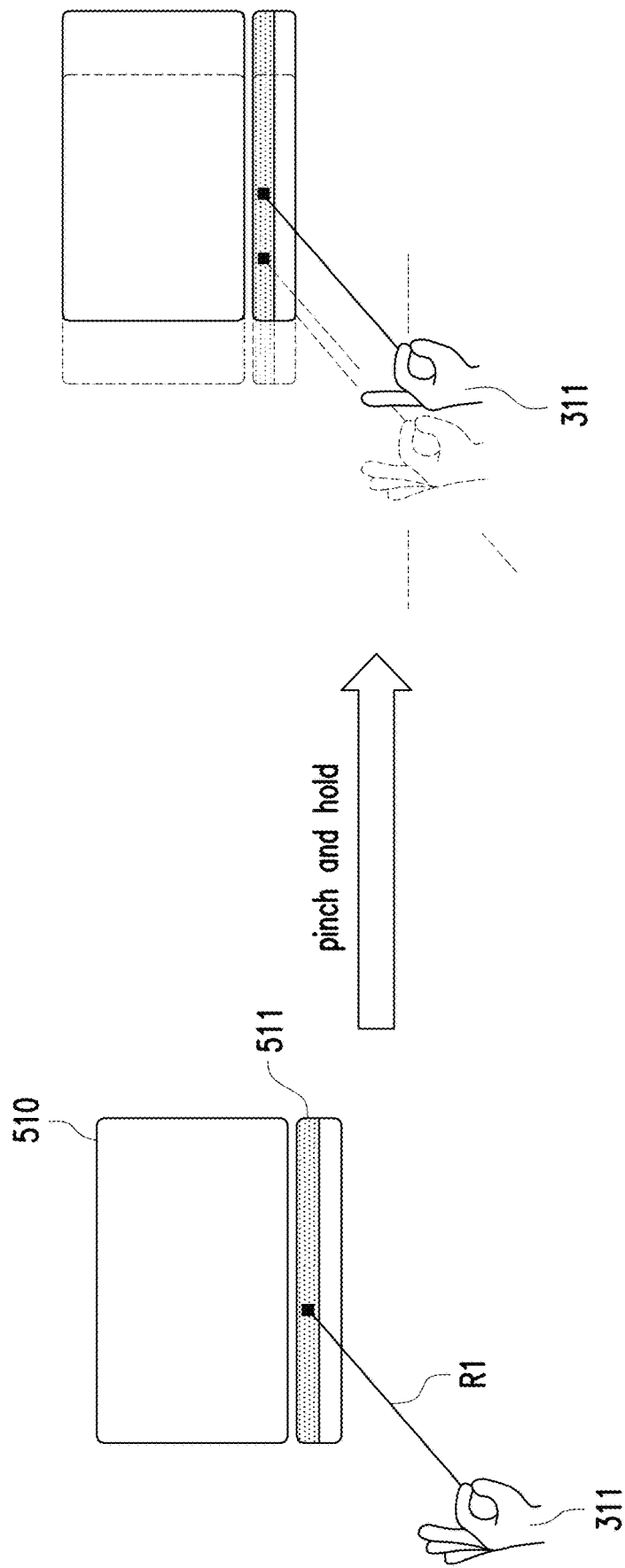
FIG. 5 shows an application scenario according to a second embodiment of the disclosure.

See FIG. 5, which shows an application scenario according to a second embodiment of the disclosure. In FIG. 5, the processor 104 shows a specific object 510 in the virtual world, wherein the specific object 510 has a first interacting portion 511.

In this embodiment, the pinch gesture may be a pinch-and-hold gesture. In one embodiment, when the processor 104 detects a pinch gesture, the processor 104 may determine whether the pinch gesture has been maintained for more than a time threshold. In response to determining that the pinch gesture has been maintained for more than the time threshold, the processor 104 may determine that the pinch gesture is the pinch-and-hold gesture. On the other hand, in response to determining that the pinch gesture is not maintained for more than the time threshold, the processor 104 may determine that the pinch gesture is a pinch-and-release gesture, but the disclosure is not limited thereto.

In FIG. 5, in response to determining that the indicator R1 indicates (e.g., points to) the first interacting portion 511 of the specific object 510 at a beginning of the pinch-and-hold gesture, the processor 104 may translate the specific object 510 in the virtual world according to a movement of the hand gesture during the hand gesture maintaining the pinch-and-hold gesture.

In addition, in response to determining that the pinch-and-hold gesture has been released, the processor 104 may fixate the specific object 510 in the virtual world.

That is, if the user wants to move the specific object 510 (e.g., a window of an application, menu or the like) rightward/leftward/upward/downward, the user may perform the pinch gesture while the indicator R1 indicating the first interacting portion 511 and move the user's hand rightward/leftward/upward/downward to translate the specific object 510 while maintaining the pinch gesture. In various embodiments, the first interacting portion 511 can be a control bar or status bar of the window of the application, menu or the like.

If the user wants to fixate the specific object 510, the user may simply release the pinch-and-hold gesture. Once the hand gesture is determined to be released from the pinch-and-hold gesture, the processor 104 would stop moving the specific object 510 along with the movement of the user's hand, but the disclosure is not limited thereto.

Accordingly, the embodiments of the disclosure provide a solution for the user to translate the specific object 510 in a novel way.

Figure 6:
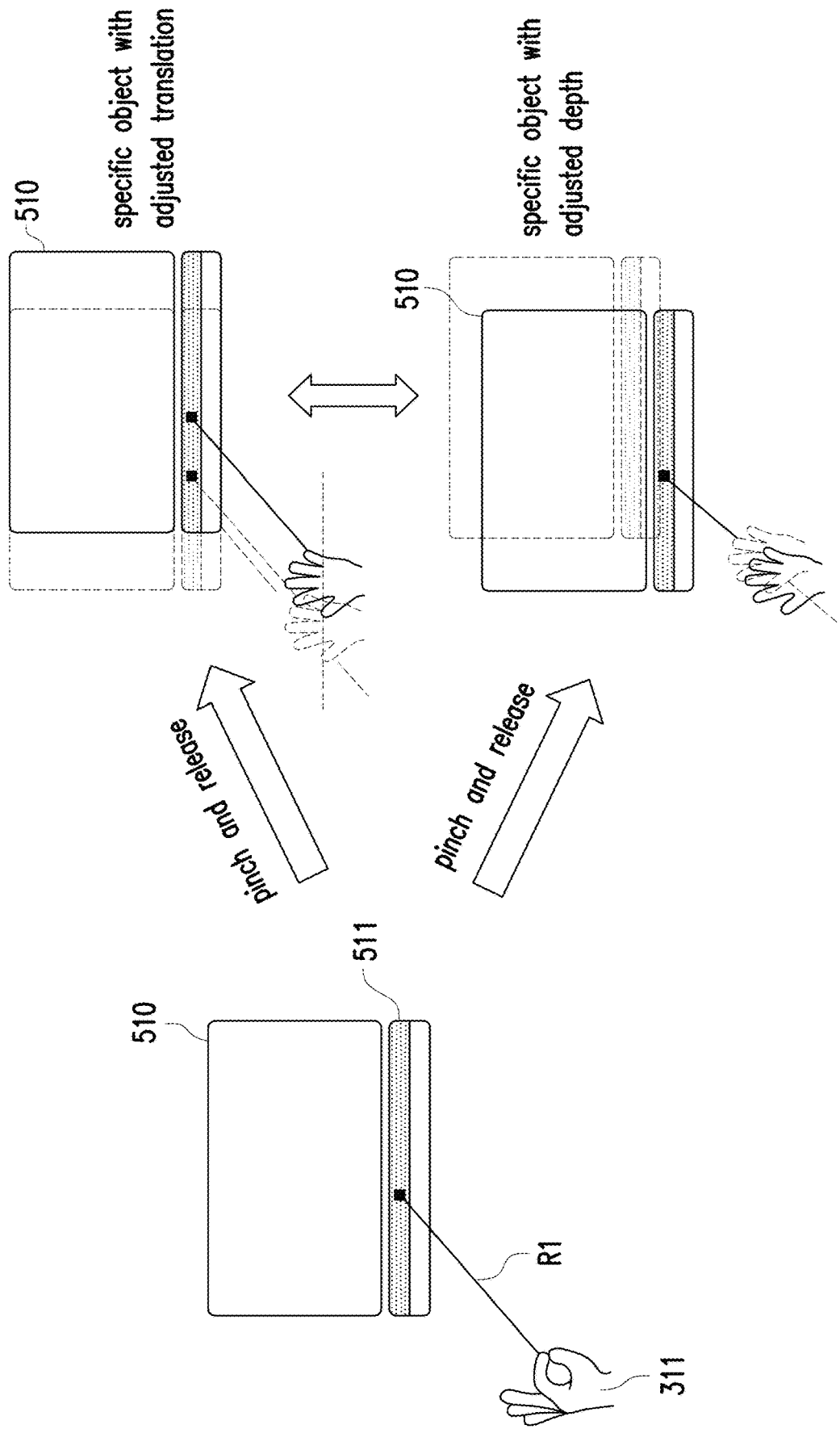
FIG. 6 shows an application scenario according to a third embodiment of the disclosure.

See FIG. 6, which shows an application scenario according to a third embodiment of the disclosure. In FIG. 6, the processor 104 shows the specific object 510 in the virtual world, wherein the specific object 510 has the first interacting portion 511.

In this embodiment, the pinch gesture may be the pinch-and-release gesture. In this case, in response to determining that the indicator R1 indicates (e.g., points to) the first interacting portion 511 of the specific object 510 during the hand gesture performing the pinch-and-release gesture, the processor 104 translates the specific object 510 in the virtual world according to a translation of the hand gesture after the pinch-and-release gesture has been finished.

In FIG. 6, the hand gesture of the user's hand may be assumed to be a first gesture (e.g., the open palm gesture) after the user performing the pinch-and-release gesture.

In one embodiment, in response to determining that the hand gesture becomes the first gesture after the pinch-and-release gesture has been finished, the processor 104 adjusts a depth of the specific object 510 in the virtual world according to a depth of the hand gesture during the hand gesture maintaining the first gesture.

That is, if the user wants to move the specific object 510 (e.g., a window) rightward/leftward/upward/downward, the user may perform the pinch-and-release gesture while the indicator R1 indicating the first interacting portion 511 and move the user's hand around to translate the specific object 510 after the pinch gesture has been released.

In addition, if the user wants to adjust the depth of the specific object 510, the user may perform the pinch-and-release gesture while the indicator R1 indicating the first interacting portion 511. Next, the user may perform the first gesture after the pinch-and-release gesture has been finished, and push the user's hand forward to increase the depth of the specific object 510 or draw the user's hand backward to decrease the depth of the specific object, but the disclosure is not limited thereto.

In the third embodiment, in response to determining that another pinch-and-release gesture has been detected after the pinch-and-release gesture, the processor 104 may fixate the specific object 510 in the virtual world.

That is, if the user wants to fixate the specific object 510, the user may simply perform another pinch-and-release gesture. Once another pinch-and-release gesture has been detected, the processor 104 would stop moving the specific object 510 along with the translation and/or the depth of the user's hand, but the disclosure is not limited thereto.

Accordingly, the embodiments of the disclosure provide a solution for the user to adjust the translation and/or the depth of the specific object 510 in a novel way.

Figure 7:
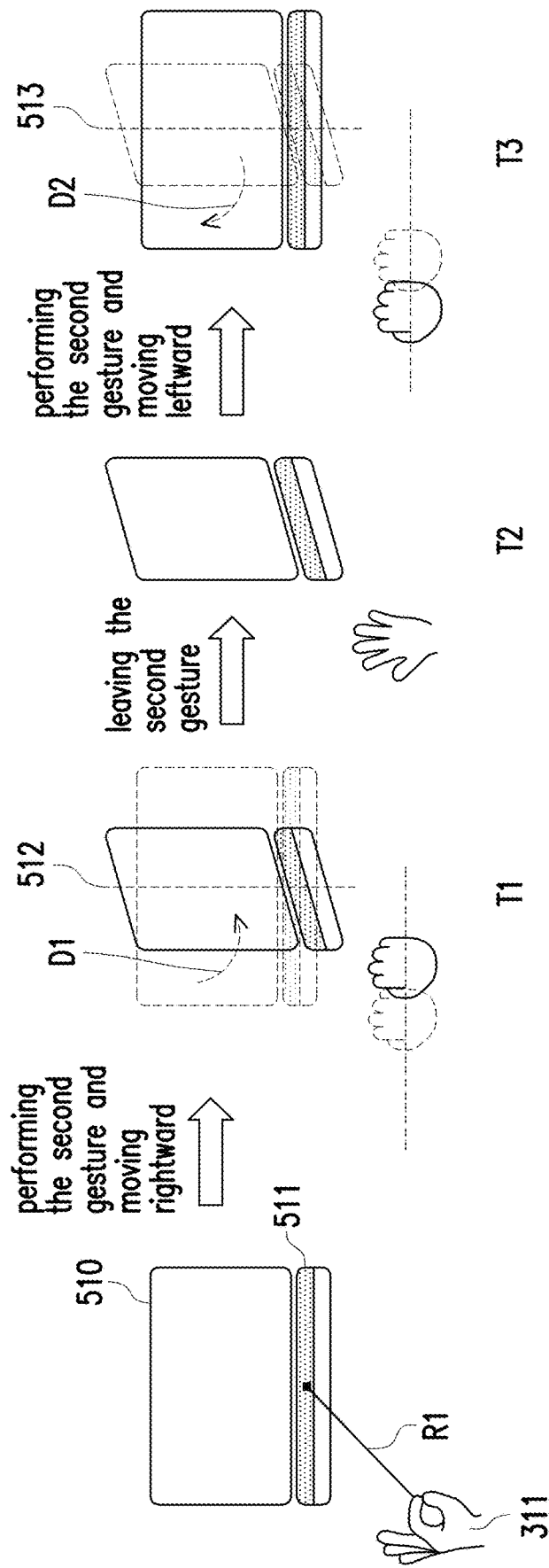
FIG. 7 shows an application scenario according to a variation of the third embodiment of the disclosure.

See FIG. 7, which shows an application scenario according to a variation of the third embodiment of the disclosure. In FIG. 7, the hand gesture of the user's hand may be assumed to be changed to a second gesture (e.g., the first gesture) after the user performing the pinch-and-release gesture of FIG. 6.

In one embodiment, in response to determining that the hand gesture becomes the second gesture after the pinch-and-release gesture has been finished, the processor 104 rotates the specific object 510 in the virtual world according to the translation of the hand gesture during the hand gesture maintaining the second gesture.

That is, if the user wants to rotate the specific object 510 (e.g., a window) in a clockwise or counter-clockwise direction, the user may perform the pinch-and-release gesture while the indicator R1 indicating the first interacting portion 511, perform the second gesture, and move the user's hand leftward or rightward while maintaining the second gesture to rotate the specific object 510 clockwise or counter-clockwise.

In FIG. 7, once the hand gesture is determined to be performing the second gesture after the pinch-and-release gesture at a timing point T1, the processor 104 may record the current position of the user's hand as an original position and determine a rotation axis 512 (e.g., the central line) on the specific object 510. In this case, if the user's hand moves rightward, the processor 104 may rotate the specific object 510 in a first direction D1 (e.g., a counter-clockwise direction) along the rotation axis 512, and the degree of rotation can be positively related to the translation of the user's hand relative to the original position.

In one embodiment, in response to determining that the hand gesture leaves the second gesture (e.g., the user's hand is changed to perform the first gesture) at a timing point T2, the processor 104 may stop rotating the specific object 510 along with the user's hand. In this case, the processor 104 may adjust the translation and/or depth of the specific object 510 based on the discussions of FIG. 6, but the disclosure is not limited thereto.

In one embodiment, in response to determining that the hand gesture performs the second gesture again at a timing point T3, the processor 104 may record the current position of the user's hand as the original position and determine a rotation axis 513 (e.g., the central line) on the specific object 510. In this case, if the user's hand moves leftward, the processor 104 may rotate the specific object 510 in a second direction D2 (e.g., a clockwise direction) along the rotation axis 513, and the degree of rotation can be positively related to the translation of the user's hand relative to the original position.

In addition, as discussed in FIG. 6, if the user wants to fixate the specific object 510, the user may simply change the hand gesture to perform another pinch-and-release gesture. Once another pinch-and-release gesture has been detected, the processor 104 would stop rotating/translating/zooming the specific object 510 along with the translation and/or the depth of the user's hand, but the disclosure is not limited thereto.

Accordingly, the embodiments of the disclosure provide a solution for the user to adjust the rotation of the specific object 510 in a novel way.

See FIG. 8, which shows an application scenario according to a fourth embodiment of the disclosure. In FIG. 8, the processor 104 shows the specific object 510 in the virtual world, wherein the specific object 510 has a second interacting portion 513, wherein the second interacting portion 513 can be, for example, a handle.

In one embodiment, the processor 104 can show the second interacting portion 513 when the indicator R1 is indicating (e.g., pointing to) the specific object 510 or show the second interacting portion 513 along with showing the specific object 510, but the disclosure is not limited thereto.

In the fourth embodiment, the pinch gesture can be the pinch-and-release gesture or the pinch-and-hold gesture.

In the embodiment where the pinch gesture is the pinch-and-release gesture, the processor 104 determines whether the indicator R1 indicates the second interacting portion 513 of the specific object 510 during the hand gesture performing the pinch-and-release gesture. In response to determining that the indicator R1 indicates the second interacting portion 513 of the specific object 510 during the hand gesture performing the pinch-and-release gesture, the processor 104 rotates the specific object 510 in the virtual world according to a translation of the hand gesture after the pinch-and-release gesture has been finished.

In the embodiment where the pinch gesture is the pinch-and-release gesture of FIG. 8, the mechanism of rotating the specific object 510 is similar to the mechanism of rotating the specific object 510 introduced in FIG. 7, except that the hand gesture does not need to be maintained as the second gesture while rotating the specific object 510.

In the embodiment where the pinch gesture is the pinch-and-release gesture, in response to determining that another pinch-and-release gesture has been detected, the processor 104 can fixate the specific object 510 in the virtual world.

In the embodiment where the pinch gesture is the pinch-and-hold gesture, the processor 104 determines whether the indicator R1 indicates the second interacting portion 513 of the specific object 510 at a beginning of the pinch-and-hold gesture. In response to determining that the indicator R1 indicates the second interacting portion 513 of the specific object 510 at a beginning of the pinch-and-hold gesture, the processor 104 rotates the specific object 510 in the virtual world according to a translation of the hand gesture during the hand gesture maintaining the pinch-and-hold gesture.

In the embodiment where the pinch gesture is the pinch-and-hold gesture of FIG. 8, the mechanism of rotating the specific object 510 is similar to the mechanism of rotating the specific object 510 introduced in FIG. 7, except that the hand gesture needs to be maintained as the pinch gesture while rotating the specific object 510.

In the embodiment where the pinch gesture is the pinch-and-hold gesture, in response to determining that the pinch-and-hold gesture has been released, the processor 104 can fixate the specific object 510 in the virtual world.

Accordingly, the embodiments of the disclosure provide a solution for the user to adjust the rotation of the specific object 510 in a novel way.

See FIG. 9A and FIG. 9B, which show application scenarios according to a fifth embodiment of the disclosure. In FIG. 9A, the processor 104 shows the specific object 510 in the virtual world, wherein the specific object 510 has a content area 514 for showing the content corresponding to the specific object 510. For example, if the specific object 510 is a browser window, the content area 514 may show, for example, a webpage, but the disclosure is not limited thereto.

In the fifth embodiment, the pinch gesture can be the pinch-and-release gesture or the pinch-and-hold gesture.

In one embodiment, in response to determining that the indicator R1 indicates the content area 514 in a case of the pinch gesture is determined to be the pinch-and-release gesture, the processor 104 may trigger the content area 514. For example, if the processor 104 determines that the pinch-and-release gesture is detected while the indicator R1 indicating (e.g., pointing to) an option 515 in the content area 514, the processor 104 may accordingly trigger the option 515 and perform the operations corresponding to the triggered option 515, but the disclosure is not limited thereto.

In one embodiment, in response to determining that the indicator R1 indicates the content area 514 in a case of the pinch gesture is determined to be the pinch-and-hold gesture, the processor 104 may scroll the content area 514 according to a movement of the hand gesture during the hand gesture maintaining the pinch-and-hold gesture. For example, if the processor 104 determines that the pinch-and-hold gesture is detected while the indicator R1 indicating (e.g., pointing to) the content area 514, the processor 104 may accordingly scroll the content area 514 upward/downward when the user's hand moves upward/downward while maintaining the pinch gesture, but the disclosure is not limited thereto.

In FIG. 9B, the processor 104 shows the specific object 910 in the virtual world, wherein the specific object 910 has a content area 914 for showing the content corresponding to the specific object 910. For example, if the specific object 910 is a VR user interface object, the content area 914 may show buttons corresponding to various VR functions, but the disclosure is not limited thereto.

In the fifth embodiment, the pinch gesture can be the pinch-and-release gesture or the pinch-and-hold gesture.

In one embodiment, in response to determining that the indicator R1 indicates the content area 914 in a case of the pinch gesture is determined to be the pinch-and-release gesture, the processor 104 may trigger the content area 914. For example, if the processor 104 determines that the pinch-and-release gesture is detected while the indicator R1 indicating (e.g., pointing to) an option 915 in the content area 914, the processor 104 may accordingly trigger the option 915 and perform the operations corresponding to the triggered option 915, but the disclosure is not limited thereto.

In one embodiment, in response to determining that the indicator R1 indicates the content area 914 in a case of the pinch gesture is determined to be the pinch-and-hold gesture, the processor 104 may scroll the content area 914 according to a movement of the hand gesture during the hand gesture maintaining the pinch-and-hold gesture. For example, if the processor 104 determines that the pinch-and-hold gesture is detected while the indicator R1 indicating (e.g., pointing to) the content area 914, the processor 104 may accordingly scroll the content area 914 upward/downward when the user's hand moves upward/downward while maintaining the pinch gesture, but the disclosure is not limited thereto.

Accordingly, the embodiments of the disclosure provide a solution for the user to trigger or scroll the content areas 514 and 914 in a novel way.

Figure 10B:
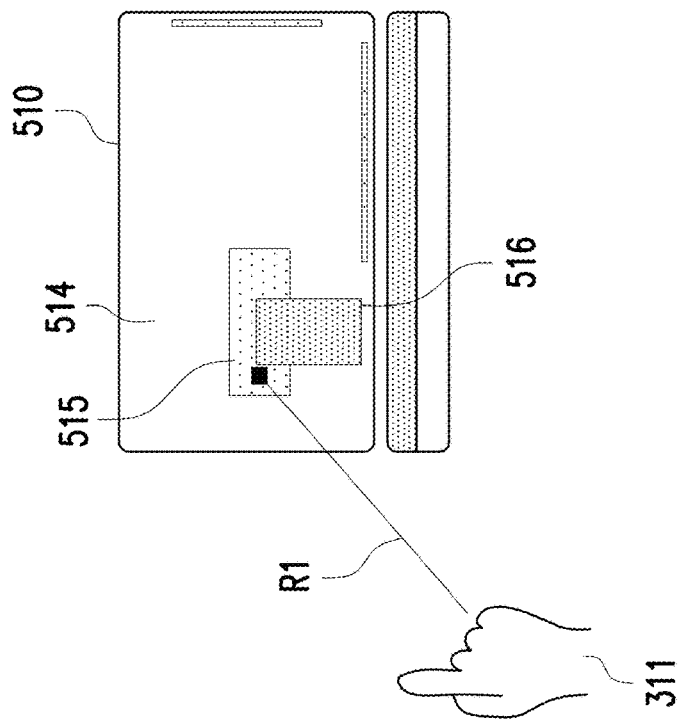
FIG. 10A and FIG. 10B show application scenarios of other mechanisms for interacting with the virtual world according to an embodiment of the disclosure.
Figure 10A:
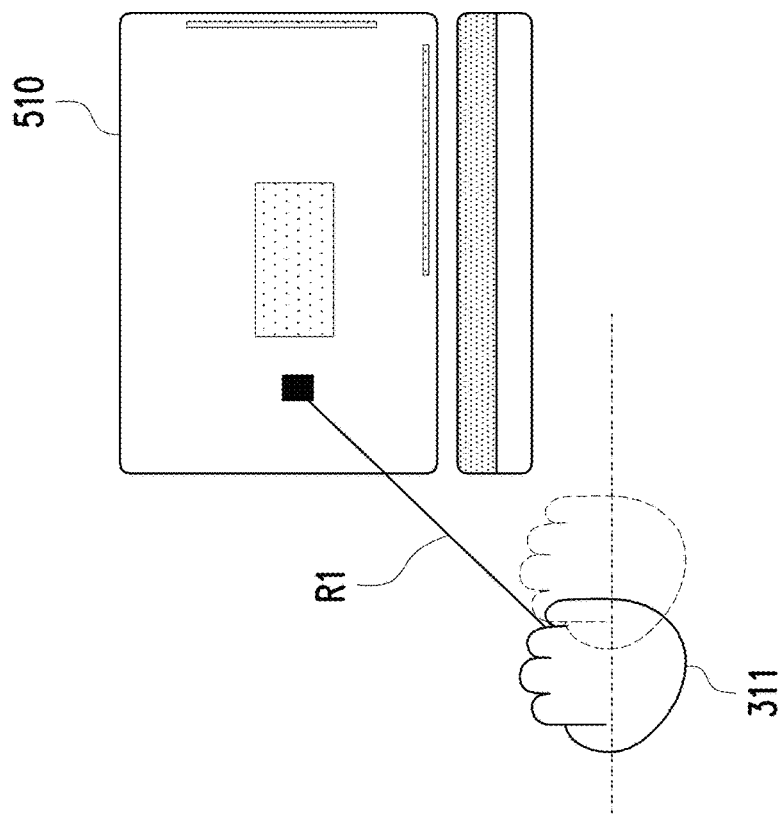

See FIG. 10A and FIG. 10B, which show application scenarios of other mechanisms for interacting with the virtual world according to an embodiment of the disclosure.

In FIG. 10A, the processor 104 shows the specific object 510 in the virtual world. In the embodiment, the processor 104 determines whether the hand gesture is the second gesture (e.g., the first gesture) while the indicator R1 indicates the specific object 510. In response to determining that the hand gesture is the second gesture while the indicator R1 indicates the specific object 510, the processor 104 may translate the specific object 510 in the virtual world according to a translation of the hand gesture during the hand gesture maintaining the second gesture.

From another perspective, the specific object 510 can be understood as being grabbed and moved around by the hand gesture, but the disclosure is not limited thereto.

In FIG. 10A, in response to determining that the hand gesture is changed from the second gesture to other gesture (e.g., the open palm gesture), the processor 104 may stop translating the specific object 510 in the virtual world according to the translation of the hand gesture, but the disclosure is not limited thereto.

In FIG. 10B, the processor 104 shows the specific object 510 in the virtual world. In the embodiment, the processor 104 determines whether the hand gesture is a third gesture (e.g., a hand gesture where the index finger is sticked out) while the indicator R1 indicating (e.g., pointing to) the specific object 510. In response to determining that the hand gesture is the third gesture while the indicator R1 indicating the specific object 510, the processor 104 may show a right click menu 516 in the content area 514 indicated by the indicator R1 in the virtual world.

In the example of FIG. 10B, since the hand gesture is the third gesture while the indicator R1 indicating the option 515 in the specific object 510, the content shown in the right click menu 516 can be adjusted to be corresponding to the option 515, but the disclosure is not limited thereto.

See FIG. 11, which shows a schematic diagram of a pinch object according to an embodiment of the disclosure. In FIG. 11, the processor 104 can show the hand object 1111, wherein the hand object 1111 includes an index finger object 1111a and a thumb object 1111b. In the embodiment, the processor 104 can show a pinch object 1120 between the index finger object 1111a and the thumb object 1111b, and the processor 104 can deform the pinch object 1120 based on a distance between the index finger object 1111a and the thumb object 1111b, wherein a deformation degree of the pinch object 1120 is negatively related to the distance between the index finger object 1111a and the thumb object 1111b.

In FIG. 11, the pinch object 1120 can be shown as a pinch ball disposed between the index finger object 1111a and the thumb object 1111b. In the embodiment, during the user performing the pinch gesture, the distance between the index finger object 1111a and the thumb object 1111b would be getting smaller and smaller, such that the deformation degree of the pinch object 1120 would be higher and higher.

In one embodiment, once the processor 104 determines that the user has properly performed the pinch gesture, the processor 104 can stop showing the pinch object 1120. Accordingly, the user can visually check whether the pinch gesture has been properly performed.

See FIG. 12, which shows a schematic diagram of a gesture for invoking a synchronization menu according to an embodiment of the disclosure. In FIG. 12, when the user wants to invoke the synchronization menu (which includes several buttons corresponding to different menu tools), the user may perform the gesture (e.g., a victory gesture) shown in FIG. 12. In this case, the processor 104 may start to accumulate the time that the hand gesture has been maintained as the victory gesture and show the corresponding progress circle.

In one embodiment, once the victory gesture has been determined to be maintained for more than a time threshold, the processor 104 may show the synchronization menu for the user to see and choose the desired menu tool.

In one embodiment, if the user wants to turn off the synchronization menu, the user may perform the procedure shown in FIG. 12 again, and the processor 104 may accordingly turn off the synchronization menu, but the disclosure is not limited thereto.

In one embodiment, the user may perform the pinch-and-release gesture while the indicator R1 indicating the button corresponding to the required menu tool to trigger the required menu tool on the synchronization menu.

In the embodiments of the disclosure, in response to determining that a menu tool has been selected, the processor 104 may adjust an appearance of the pinch object 1120 to be corresponding to the selected menu tool.

See FIG. 13, which shows a schematic diagram of changing the appearance of the pinch object according to an embodiment of the disclosure. In FIG. 13, it is assumed that the selected menu tool is an emoji tool. In this case, the processor 104 can adjust the appearance of the pinch object 1120 to be, for example, an emoji. In addition, the pinch object 1120 can still be deformed in response to the approaching index finger object 1111a and the thumb object 1111b.

In one embodiment, in response to determining that the hand gesture is the pinch gesture, the processor 104 may perform a specific function corresponding to the selected menu tool. In FIG. 13, since the selected menu tool is the emoji tool, the processor 104 may add emojis into the virtual world in response to determining that the pinch gesture has been performed, but the disclosure is not limited thereto.

Figure 14:
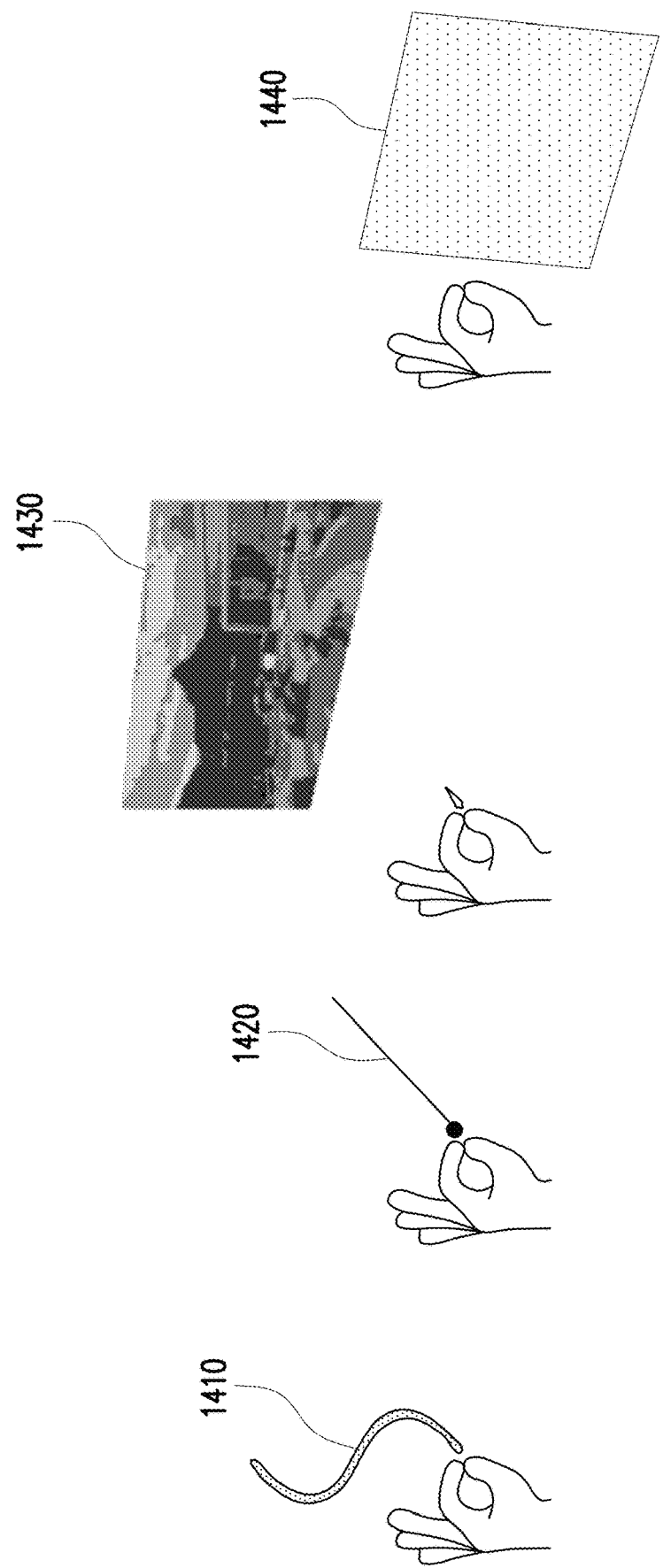
FIG. 14 shows a schematic diagram of different functions corresponding to the selected menu tool according to FIG. 13.

See FIG. 14, which shows a schematic diagram of different functions corresponding to the selected menu tool according to FIG. 13. In FIG. 14, if the selected menu tool is a pen, the processor 104 may draw a line 1410 in the virtual world during the user moving around the maintained pinch gesture. If the selected menu tool is a pointer, the processor 104 may show a pointing ray 1420 in the virtual world during the user moving around the maintained pinch gesture. If the selected menu tool is a camera, the processor 104 may take a snapshot 1430 of the virtual world in response to the pinch gesture. If the selected menu tool is a sticky not, the processor 104 may add a sticky note 1440 to the virtual world in response to the pinch gesture, but the disclosure is not limited thereto.

Figure 15:
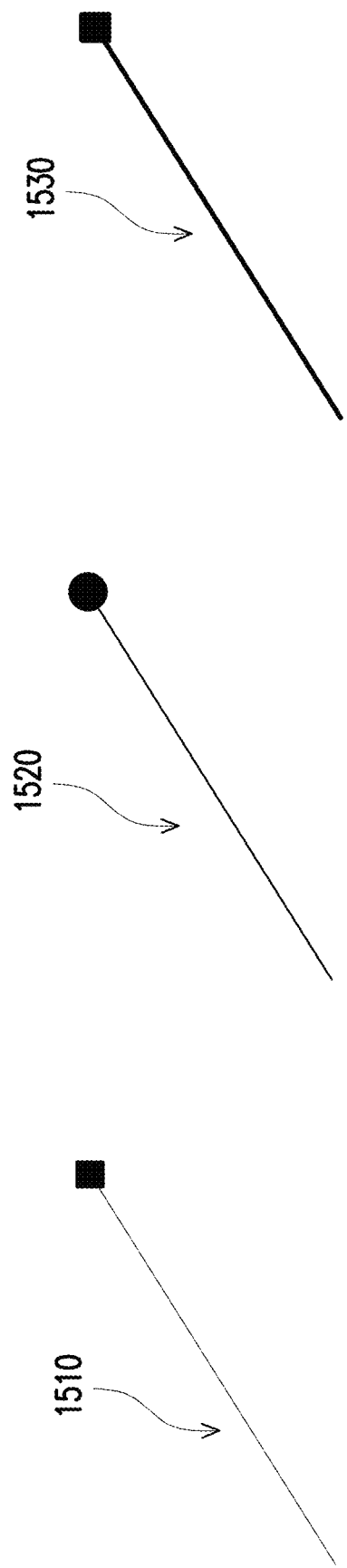
FIG. 15 shows a schematic diagram of different visual type of the indicator according to an embodiment of the disclosure.

See FIG. 15, which shows a schematic diagram of different visual type of the indicator according to an embodiment of the disclosure. In the embodiment, the appearance of the indicator R1 (e.g., the raycast) can be adaptively changed based on the use case.

In FIG. 15, in response to determining that the raycast is pointing to an interactable object (e.g., the specific object 510), the processor 104 may show the raycast in a first visual type 1510. In response to determining that the hand gesture is performing the pinch gesture, the processor 104 may show the raycast in a second visual type 1520. In response to determining that the raycast is not pointing to any interactable object and the hand gesture is not performing the pinch gesture, the processor 104 may show the raycast in a third visual type 1530. Accordingly, the user may visually check the operation status of the raycast.

The disclosure further provides a computer readable storage medium for executing the method for interacting with a virtual world. The computer readable storage medium is composed of a plurality of program instructions (for example, a setting program instruction and a deployment program instruction) embodied therein. These program instructions can be loaded into the host 200 and executed by the same to execute the method for interacting with a virtual world and the functions of the host 200 described above.

In summary, the embodiments of the disclosure provide several solutions for the user to interact with the virtual world in novel ways. Accordingly, the user can interact with the virtual world in a more intuitive and efficient way, which improves the user experience.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for interacting with a virtual world, adapted to a host, comprising:
   determining a hand gesture and accordingly determining an indicator in the virtual world;
   in response to determining that the hand gesture is a pinch gesture, performing a specific function corresponding to a position indicated by the indicator in the virtual world or a specific object indicated by the indicator in the virtual world, comprising:
      in response to determining that the pinch gesture has been maintained for a time threshold, showing a reference area at the position indicated by the indicator in the virtual world, showing a visual guide corresponding to the reference area during the hand gesture maintaining the pinch gesture, and showing a turn area in the virtual world;

in response to determining that the pinch gesture has been released without triggering the turn area, moving a user representative object to the reference area.

2. The method according to claim 1, further comprising:
in response to determining that the pinch gesture has been released while triggering the turn area, turning a view angle of the user representative object in the virtual world by a specific angle corresponding to the turn area.

3. The method according to claim 1, wherein the pinch gesture is a pinch-and-hold gesture, the specific object corresponding to the indicator in the virtual world has a first interacting portion, and the step of performing the specific function corresponding to the position indicated by the indicator in the virtual world or the specific object indicated by the indicator in the virtual world comprises:
in response to determining that the indicator indicates the first interacting portion of the specific object at a beginning of the pinch-and-hold gesture, translating the specific object in the virtual world according to a movement of the hand gesture during the hand gesture maintaining the pinch-and-hold gesture,
wherein the method further comprises:
in response to determining that the pinch-and-hold gesture has been released, fixating the specific object in the virtual world.

4. The method according to claim 1, wherein the pinch-related gesture is a pinch-and-release gesture, the specific object corresponding to the indicator in the virtual world has a first interacting portion, and the step of performing the specific function corresponding to the position indicated by the indicator in the virtual world or the specific object indicated by the indicator in the virtual world comprises:
in response to determining that the indicator indicates the first interacting portion of the specific object during the hand gesture performing the pinch-and-release gesture, translating the specific object in the virtual world according to a translation of the hand gesture after the pinch-and-release gesture has been finished,
wherein the method further comprises:
in response to determining that another pinch-and-release gesture has been detected after the pinch-and-release gesture, fixating the specific object in the virtual world.

5. The method according to claim 4, further comprising:
in response to determining that the hand gesture becomes a first gesture after the pinch-and-release gesture has been finished, adjusting a depth of the specific object in the virtual world according to a depth of the hand gesture during the hand gesture maintaining the first gesture.

6. The method according to claim 4, further comprising:
in response to determining that the hand gesture becomes a second gesture after the pinch-and-release gesture has been finished, rotating the specific object in the virtual world according to the translation of the hand gesture during the hand gesture maintaining the second gesture.

7. The method according to claim 1, wherein the pinch gesture is a pinch-and-hold gesture, the specific object corresponding to the indicator in the virtual world has a second interacting portion, and the step of performing the specific function corresponding to the position indicated by the indicator in the virtual world or the specific object indicated by the indicator in the virtual world comprises:
in response to determining that the indicator indicates the second interacting portion of the specific object during the hand gesture performing the pinch-and-release gesture, rotating the specific object in the virtual world according to a translation of the hand gesture after the pinch-and-release gesture has been finished,
wherein the method further comprises:
in response to determining that another pinch-and-release gesture has been detected, fixating the specific object in the virtual world.

8. The method according to claim 1, wherein the pinch-related gesture is a pinch-and-release gesture, the specific object corresponding to the indicator in the virtual world has a second interacting portion, and the step of performing the specific function corresponding to the position indicated by the indicator in the virtual world or the specific object indicated by the indicator in the virtual world comprises:
in response to determining that the indicator indicates the second interacting portion of the specific object at a beginning of the pinch-and-hold gesture, rotating the specific object in the virtual world according to a translation of the hand gesture during the hand gesture maintaining the pinch-and-hold gesture,
wherein the method further comprises:
in response to determining that the pinch-and-hold gesture has been released, fixating the specific object in the virtual world.

9. The method according to claim 1, wherein the specific object comprises a content area, and the step of performing the specific function corresponding to the position indicated by the indicator in the virtual world or the specific object indicated by the indicator in the virtual world comprises:
in response to determining that the indicator points to the content area in a case of the pinch gesture is determined to be a pinch-and-hold gesture, scrolling the content area according to a movement of the hand gesture during the hand gesture maintaining the pinch-and-hold gesture; and
in response to determining that the indicator points to the content area in a case of the pinch gesture is determined to be a pinch-and-release gesture, performing an operation corresponding to the content area.

10. The method according to claim 1, further comprising:
in response to determining that the hand gesture is a second gesture while the indicator indicates the specific object, translating the specific object in the virtual world according to a translation of the hand gesture during the hand gesture maintaining the second gesture.

11. The method according to claim 1, wherein the specific object comprises a content area, further comprising:
in response to determining that the hand gesture is a third gesture while the indicator indicating the specific object, showing a right click menu in the content area corresponding to the indicator in the virtual world.

12. The method according to claim 1, further comprising:
showing a hand object corresponding to the hand gesture in the virtual world, wherein the hand object comprises an index finger object and a thumb object;
showing a pinch object between the index finger object and the thumb object;
deforming the pinch object based on a distance between the index finger object and the thumb object, wherein a deformation degree of the pinch object is negatively related to the distance between the index finger object and the thumb object.

13. The method according to claim 12, further comprising:
stopping showing the pinch object in response to determining that the hand gesture is the pinch gesture.

14. The method according to claim 12, further comprising:
in response to determining that a menu tool has been selected, adjusting an appearance of the pinch object to be corresponding to the selected menu tool.

15. The method according to claim 14, wherein after the step of adjusting the appearance of the pinch object to be corresponding to the selected menu tool, the method further comprises:
in response to determining that the hand gesture is the pinch gesture, performing a specific function corresponding to the selected menu tool.

16. The method according to claim 1, wherein the indicator is a raycast emitted from a hand object corresponding to the hand gesture in the virtual world, and the method further comprises:
in response to determining that the raycast is pointing to an interactable object, showing the raycast in a first visual type;
in response to determining that the hand gesture is performing the pinch gesture, showing the raycast in a second visual type;
in response to determining that the raycast is not pointing to any interactable object and the hand gesture is not performing the pinch gesture, showing the raycast in a third visual type.

17. The method according to claim 1, further comprising:
in response to determining that the pinch gesture has been maintained for more than a time threshold, determining that the pinch gesture is a pinch-and-hold gesture;
in response to determining that the pinch gesture is not maintained for more than the time threshold, determining that the pinch gesture is a pinch-and-release gesture.

18. A host, comprising:
a non-transitory storage circuit, storing a program code; and
a processor, coupled to the non-transitory storage circuit and accessing the program code to perform:
determining a hand gesture and accordingly determining an indicator in a virtual world;
in response to determining that the hand gesture is a pinch gesture, performing a specific function corresponding to a position indicated by the indicator in the virtual world or a specific object indicated by the indicator in the virtual world, comprising:
in response to determining that the pinch gesture has been maintained for a time threshold, showing a reference area at the position indicated by the indicator in the virtual world, showing a visual guide corresponding to the reference area during the hand gesture maintaining the pinch gesture, and showing a turn area in the virtual world;
in response to determining that the pinch gesture has been released without triggering the turn area, moving a user representative object to the reference area.

19. A non-transitory computer readable storage medium, the computer readable storage medium recording an executable computer program, the executable computer program being loaded by a host to perform steps of:
determining a hand gesture and accordingly determining an indicator in a virtual world;
in response to determining that the hand gesture is a pinch gesture, performing a specific function corresponding to a position indicated by the indicator in the virtual world or a specific object indicated by the indicator in the virtual world, comprising:
in response to determining that the pinch gesture has been maintained for a time threshold, showing a reference area at the position indicated by the indicator in the virtual world, showing a visual guide corresponding to the reference area during the hand gesture maintaining the pinch gesture, and showing a turn area in the virtual world;
in response to determining that the pinch gesture has been released without triggering the turn area, moving a user representative object to the reference area.

* * * * *